US009055396B2

(12) United States Patent
Keerthi

(10) Patent No.: US 9,055,396 B2
(45) Date of Patent: Jun. 9, 2015

(54) DETERMINING THE POSITION OF A MOBILE DEVICE IN AN INDOOR ENVIRONMENT

(75) Inventor: Arvind Vijay Keerthi, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 99 days.

(21) Appl. No.: 13/700,393

(22) PCT Filed: Sep. 4, 2012

(86) PCT No.: PCT/US2012/053675
§ 371 (c)(1),
(2), (4) Date: Nov. 27, 2012

(87) PCT Pub. No.: WO2013/137930
PCT Pub. Date: Sep. 19, 2013

(65) Prior Publication Data
US 2013/0244689 A1 Sep. 19, 2013

(51) Int. Cl.
H04W 24/00 (2009.01)
H04W 4/02 (2009.01)

(52) U.S. Cl.
CPC ....................... *H04W 4/02* (2013.01)

(58) Field of Classification Search
CPC ........ H04W 4/02; H04W 64/00; H04W 4/025
USPC .......................................... 455/456.1–456.6
See application file for complete search history.

(56) References Cited

U.S. PATENT DOCUMENTS

| 6,148,211 | A  | * | 11/2000 | Reed et al. ................. 455/456.2 |
| 7,457,349 | B2 |   | 11/2008 | Grilli et al. |
| 7,956,807 | B1 |   | 6/2011  | Celebi et al. |
| 2004/0063439 | A1 | * | 4/2004 | Glazko et al. ................. 455/455 |
| 2005/0009521 | A1 | * | 1/2005 | Preece ....................... 455/435.1 |
| 2007/0097927 | A1 |   | 5/2007 | Gorokhov et al. |
| 2010/0322184 | A1 | * | 12/2010 | Xiao ............................ 370/330 |
| 2011/0081933 | A1 | * | 4/2011 | Suh et al. ...................... 455/509 |
| 2011/0103307 | A1 | * | 5/2011 | Kim et al. ..................... 370/328 |
| 2011/0230144 | A1 | * | 9/2011 | Siomina et al. ................. 455/68 |
| 2011/0269481 | A1 | * | 11/2011 | Halfmann et al. ......... 455/456.1 |
| 2012/0020302 | A1 | * | 1/2012 | Xiao ............................ 370/328 |
| 2012/0040691 | A1 | * | 2/2012 | Han et al. .................. 455/456.1 |
| 2013/0176883 | A1 | * | 7/2013 | Han et al. ...................... 370/252 |

OTHER PUBLICATIONS

Laderriere, C., et al, Wide-band indoor localization effectiveness in presence of moving people, Positioning, Navigation and Communications, 2008, WPNC 2008, 5th Workshop on Mar. 27, 2008, pp. 103-111. Accessed online at IEEExplore Digital Library on Jun. 23, 2011.
Rehman, W., et al, CILoS: A CDMA indoor localization system, pp. 1-10, Department of Computer Science, University of Toronto, Toronto, ON M5S Canada.
Yong Lee, J, et al, Ranging in a dense multipath environment using an UWB radio link, pp. 1677-1684, IEEE Journal on Selected Areas in Communications, vol. 20, No. 9, Dec. 2002.

(Continued)

Primary Examiner — Nathan Mitchell
(74) Attorney, Agent, or Firm — Brundidge & Stanger, P.C.

(57) ABSTRACT

Technologies and implementations for determining the location of a device in an indoor environment are generally disclosed.

21 Claims, 5 Drawing Sheets

(56) References Cited

OTHER PUBLICATIONS

Heidari, M., et al, UDP Identification and error mitigation in ToA-based indoor localization systems using neural network architecture, IEEE Transactions on Wireless Communications, vol. 8, No. 7, pp. 3597-3608, Jul. 2009.

Jin, Y., et al, Indoor localization with channel impulse response based fingerprint and nonparametric regression, IEEE Transactions on Wireless Communications, vol. 9, No. 3, 1120-1128, Mar. 2010.

Hui, L., et al, Survey of wireless indoor positioning techniques and systems, Systems, Man and Cybernetics, Part C: Applications and Reviews, IEEE Transactions on Nov. 2007. Accessed online at IEEE Xplore Digital Library on Jun. 23, 2011.

Li, et al, Super-Resolution ToA estimation with diversiy for indoor geolocation, IEEE Trans, Wireless Comm. Jan. 2004.

Martin, et al., Interference and regulatory aspects of GNSS pseudolites, J. Global Positioning Systems, 2007. vol. 6, No. 2, pp. 98-107.

Rizos, C., Pseudolite augmentation of GPS, School of Surveying & Spatial Information Systems, University of New South Wales, Sydney, NSW 2052, Australia, 2005.

Rowitch, D, Technology challenges and opportunities in indoor location, 2nd Conf. Opportunistic RF Localization, Worcester Polytechnic, Jun. 13-14, 2010.

Australian Patent Office, International Search Report and Written Opinion of the International Searching Authority for PCT/US2012/053675, mailed on Oct. 18, 2012.

* cited by examiner

700 A computer program product

702 A signal bearing medium

704 Machine-readable instructions that, when executed, cause a device to:

receive a wide-band transmission transmitted from at least one base station of three or more base stations, wherein the wide-band transmission includes distributed traffic symbol portions, distributed pilot symbol portions, and intermittent punctured pilot symbol portions;

determine a first path portion of the wide-band transmission based at least in part on the intermittent punctured pilot symbol portions, wherein the first path portion of the wide-band transmission is associated with a first time delay and a second path portion of the wide-band transmission is associated with a second time delay;

determine a distance between the mobile device and the at least one base station based at least in part on the first time delay;

determine a location of the mobile device based at least in part on the determined distance; or transmit a wide-band transmission including distributed traffic symbol portions, distributed pilot symbol portions, and intermittent punctured pilot symbol portions.

| 706 a computer-readable medium | 708 a recordable medium | 710 a communications medium |

Fig. 7

DETERMINING THE POSITION OF A MOBILE DEVICE IN AN INDOOR ENVIRONMENT

This Application is the National Stage filing under 35 U.S.C. §371 of PCT Application Ser. No. PCT/US12/53675 filed on Sep. 4, 2012. The disclosure of the PCT Application is hereby incorporated herein by reference in its entirety.

BACKGROUND

Unless otherwise indicated herein, the approaches described in this section are not prior art to the claims in this application and are not admitted to be prior art by inclusion in this section.

For several purposes, it may be desirable to determine the location of a mobile device in an indoor environment. Current techniques for determining the location of a mobile device may include using a Global Positioning System (GPS). Such techniques may be unreliable and ineffective in an indoor environment.

SUMMARY

In various embodiments, the present disclosure describes example methods for determining a position of a mobile device. Example methods may include receiving, via a mobile device, a wide-band transmission having distributed traffic symbol portions, distributed pilot symbol portions, and intermittent punctured pilot symbol portions from at least one base station of three or more base stations, determining a first path portion of the wide-band transmission associated with a first time delay based on the intermittent punctured pilot symbol portions such that a second path portion of the wide-band transmission is associated with a second time delay, determining a distance between the mobile device and the at least one base station based on the first time delay, and determining a location of the mobile device based on the determined distance.

In various embodiments, the present disclosure also describes example mobile handset apparatuses. Example mobile handset apparatuses may include a housing, an antenna located within the housing, a first analog-to-digital converter operably coupled to the antenna, a second analog-to-digital converter operably coupled to the antenna such that the second analog-to-digital converter has an operating speed greater than the first analog-to-digital converter, and a processor operably coupled to the first and second analog-to-digital converters such that the processor is configured to switch between the first and second analog-to-digital converters so as to process distributed traffic symbol portions and/or distributed pilot symbol portions of a wide-band transmission transmitted from at least one base station of three or more base stations via the first analog-to-digital converter, and so as to process intermittent punctured pilot symbol portions of the wide-band transmission via the second analog-to-digital converter.

In various embodiments, the present disclosure also describes example articles. Example articles may include a signal bearing medium comprising machine-readable instructions stored thereon, which, if executed by one or more processors, operatively enable a computing device to receive, via a mobile device, a wide-band transmission having distributed traffic symbol portions, distributed pilot symbol portions, and intermittent punctured pilot symbol portions from at least one base station of three or more base stations, determine a first path portion of the wide-band transmission associated with a first time delay based on the intermittent punctured pilot symbol portions such that a second path portion of the wide-band transmission is associated with a second time delay, determine a distance between the mobile device and the at least one base station based on the first time delay, and determine a location of the mobile device based on the determined distance.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 is an illustration of an example computer program product; and

DETAILED DESCRIPTION

Figure 1:
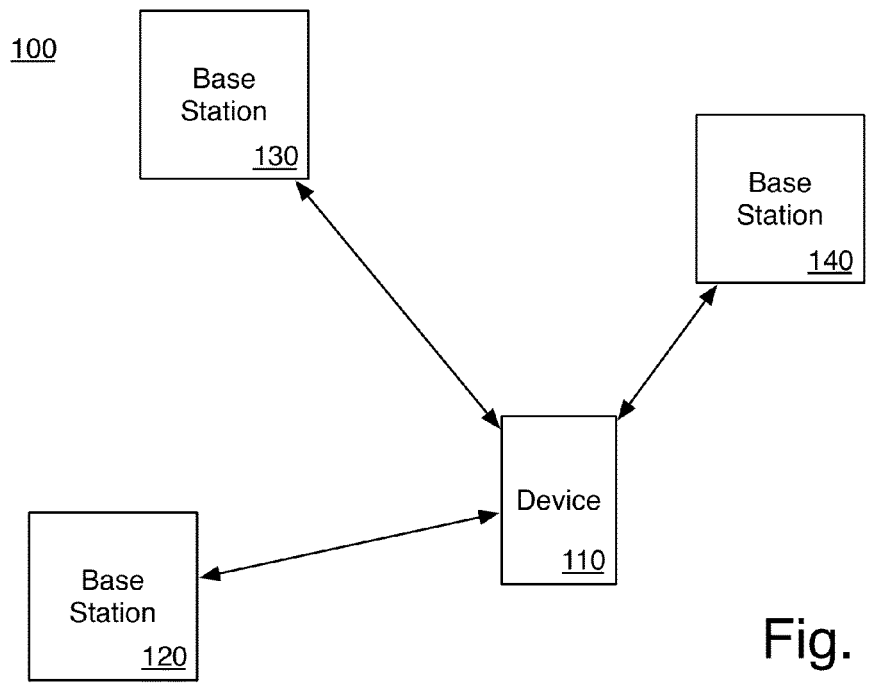
FIG. 1 is an illustration of a block diagram of an example system for determining the location of a device.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to determining the location of a device in an indoor environment.

In some examples, a location of a device, such as a mobile device, in an indoor environment may be determined. In some examples, the mobile device may receive a wide-band transmission transmitted from at least one base station of three or more base stations. In some examples, the wide-band transmission may include distributed traffic symbol portions, distributed pilot symbol portions, and intermittent punctured pilot symbol portions. In general, the intermittent punctured pilot symbol portions may provide additional pilot symbol portions that may be used to determine a shortest path portion of the wide-band transmission, where the wide-band transmission may include two or more path portions related to a multipath effect of the wide-band transmission. In some examples, the shortest path portion may represent a substantially direct path between the transmitting base station and the mobile device. In some examples, a time delay related to the shortest path portion may be determined based on the received intermittent punctured pilot symbol portions. Such a time delay may be used to determine a distance of the shortest path portion, which may be used to determine the location of the mobile device using triangulation techniques, or the like.

FIG. 1 is an illustration of a block diagram of an example system 100 for determining the location of a device, arranged in accordance with at least some embodiments of the present disclosure. As shown, system 100 may include a device 110, a base station 120, a base station 130, and a base station 140. In general, device 110 may be any suitable device. In some examples, device 100 may be a laptop computer, a mobile phone, a smartphone, a netbook device, a tablet device, a personal digital assistant, or the like. In general, base stations 120, 130, 140 may be any suitable devices. In some examples, base stations 120, 130, 140 may include an access points, a femtocell, or the like.

In general, device 110 and base stations 120, 130, 140 may communicate using any suitable communications techniques or protocols. In some examples, device 110 and base stations 120, 130, 140 may communicate using wide-band multi-tone signaling techniques. In some examples, device 110 and base stations 120, 130, 140 may communicate using wide-band multi-tone signaling techniques such that the transmitted signal may include about $2^9$ sinusoidal sub-carriers to about $2^{15}$ sinusoidal sub-carriers. In some examples, device 110 and base stations 120, 130, 140 may communicate using orthogonal frequency-division multiplexing (OFDM) techniques, code division multiplexing algorithm (CDMA) techniques such as those implemented using the CDMA2000 family of standards, 3rd generation (3G) communications techniques, 4th generation (4G) communications techniques, long-term evolution (LTE) communications techniques, or the like.

In general, device 110 may determine the location of device 110 using signals received from base stations 120, 130, 140. In some examples, device 110 may receive a wide-band transmission transmitted from one or more of base stations 120, 130, 140. In some examples, device 110 may determine the distance between device 110 and base station 120 by determining a time-of-arrival for a signal sent from base station 120 to device 110 and multiplying the time-of-arrival by the speed of light (or a similar speed based on an expected speed of travel of the sent signal). As is discussed further herein, in some examples, determining the time-of-arrival and/or distance may include determining a path portion of a multiple number of path portions such that the determined path portion has the shortest time-of-arrival and/or distance. Such multipath portions may be caused by a multipath effect based on objects between base station 120 and device 110, for example.

Device 110 may similarly determine the distances between device 110 and base station 130 and base station 140. In some examples, the determined distances may be used to determine the location of device 100 through triangulation techniques. In some examples, the path from device 110 to one or more of base stations 120, 130, 140 may not include a multipath effect. As discussed, in some examples, and, in particular, in indoor environments, a signal sent from one or more of base stations 120, 130, 140 may have a multipath effect.

Figure 2:
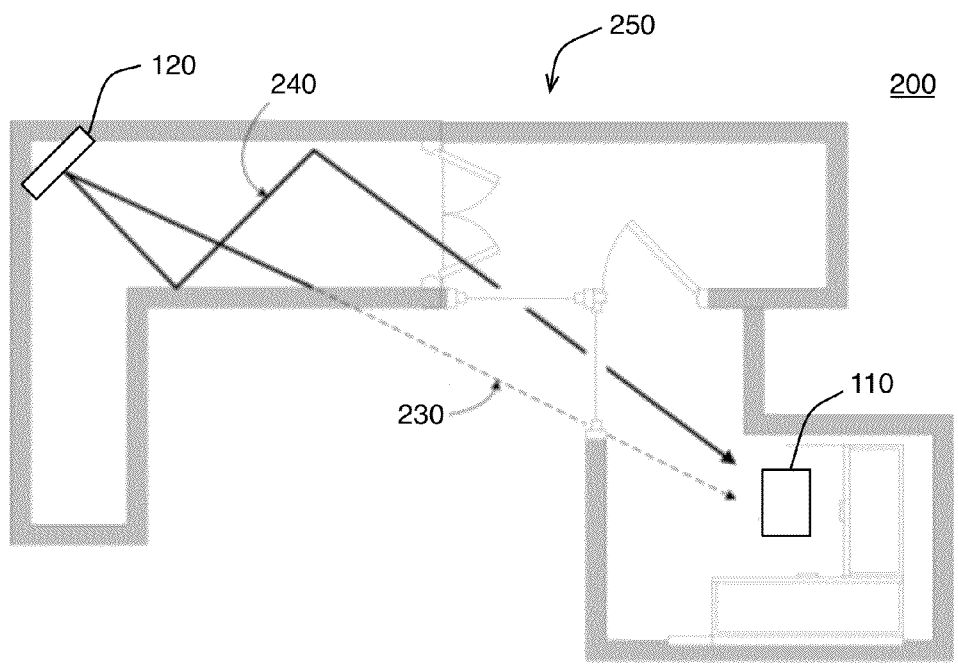
FIG. 2 is an illustration of a block diagram of an example implementation for determining the location of a device.

FIG. 2 is an illustration of a block diagram of an example implementation 200 for determining the location of a device, arranged in accordance with at least some embodiments of the present disclosure. FIG. 2 may illustrate an implementation in which the line-of-sight multipath may be much weaker in power than a later-arriving multipath. As shown, implementation 200 may include a device 110 and a base station 120 implemented in an indoor environment 250. In general, indoor environment 250 may include any indoor environment such as, for example, an airport, a mall, an office, a home, or the like. In general, the techniques and/or devices discussed herein may determine the location of device 110. Device location information may be desirable in a wide range of applications such as, for example, providing advertisers the location of a device for location-sensitive ads or coupons, providing a remote device the users location such that a friend may meet the user of the device, for use in mapping applications, or the like.

As shown, in some examples, a transmission from base station 120 may have a multipath effect such that the transmission may include a direct path 230 and a reflected path 240. In general, direct path 230 and/or reflected path 240 may be considered path portions of the transmission. In some examples, direct path 230 and/or reflected path 240 may be path portions of a wide-band transmission, as is discussed further herein. In some examples, direct path 230 may be a first path portion and reflected path 240 may be a second path portion of a wide-band transmission. In some examples, direct path 230 may be attenuated or shadowed, or the like. In some examples, direct path 230 may be attenuated by obstacles such as walls, or the like. In some examples, direct path 230 may be attenuated such that a direct path signal related to direct path 230 received at device 110 may have less power than a reflected path signal related to reflected path 240. As will be appreciated, in general direct path 230 may have a shorter time-of-arrival or time delay than the time-of-arrival or time deal reflected path 240, however, the arrival of direct path 230 may be difficult to detect due to the discussed attenuation of direct path 230. As shown, in some examples, a transmission may have two path portions. In general, a transmission may have any number of path portions.

Figure 3:
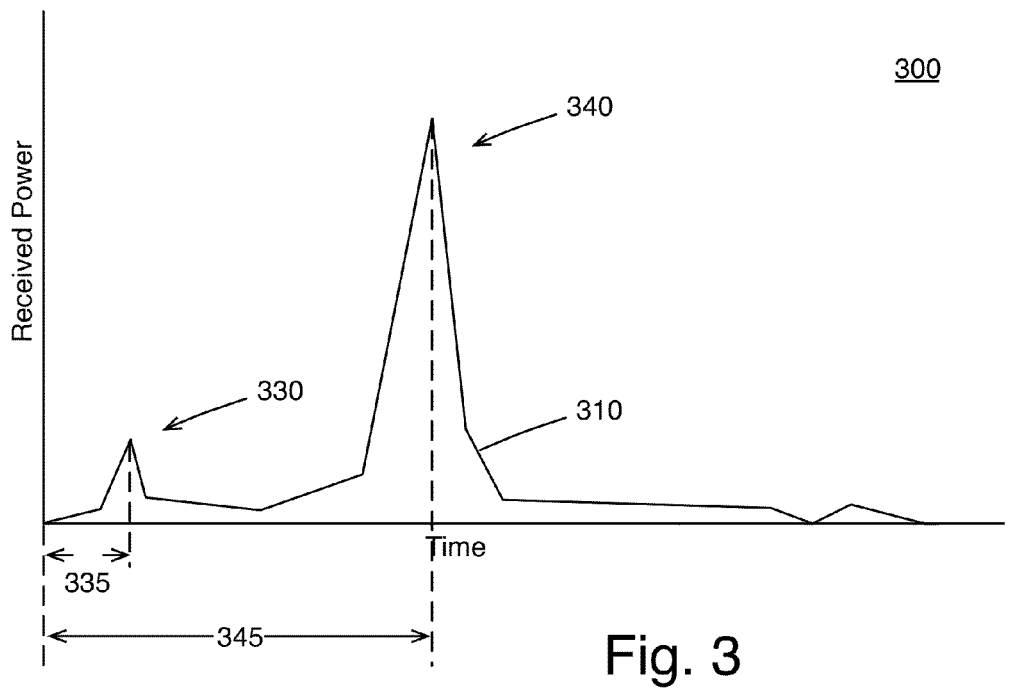
FIG. 3 is an illustration an example graph of received power over time at a device.

FIG. 3 is an illustration an example graph 300 of received power over time at a device, arranged in accordance with at least some embodiments of the present disclosure. As shown, graph 300 may include a profile 310 related to a received power over time at a device, such as device 110. In some examples, profile 310 or portions of profile 310 may be considered a power-delay profile. Profile 310 may include a peak 330 related to receiving a signal related to direct path 230 of FIG. 2 and having a related time-of-arrival or delay time 335 and a peak 340 related to receiving a signal related to reflected path 240 of FIG. 2 and having a related time-of-arrival or delay time 345. As will be appreciated, peak 330 as related to direct path 230 may be related to delay time 335 of the earliest multipath, direct path 230, and, in general, any locations determinations related to device 110 may need to use delay time 335 for an accurate location determinations. Therefore, in general, the triangulation techniques discussed with respect to FIG. 1 may require use of peak 330 and/or delay time 335 in determining the distance between base station 120 and device 110. In general, using peak 340 and or delay time 345 in such techniques may provide an inaccurate location of device 110.

Figure 4:
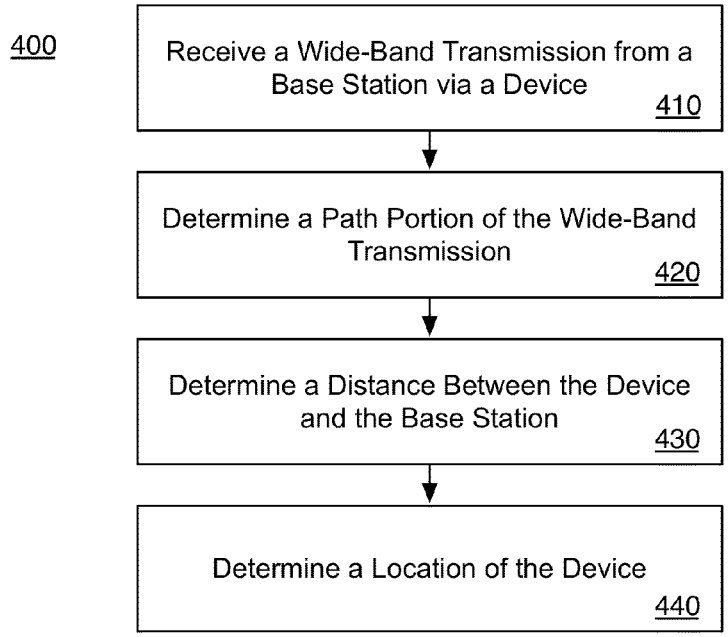
FIG. 4 is an illustration of a flow diagram of an example method for providing a location of a device.

FIG. 4 is an illustration of a flow diagram of an example method 400 for providing a location of a device, arranged in accordance with at least some embodiments of the present disclosure. In general, method 400 may be performed by any suitable device, devices, or system such as those discussed herein. In some examples, method 400 may be performed by a mobile device such as a laptop computer, a mobile phone, a smartphone, a netbook device, a tablet device, a personal digital assistant, or the like. Method 400 sets forth various functional blocks or actions that may be described as processing steps, functional operations, events and/or acts, etc., which may be performed by hardware, software, and/or firmware. Numerous alternatives to the functional blocks shown in FIG. 4 may be practiced in various implementations. For example, intervening actions not shown in FIG. 4 and/or additional actions not shown in FIG. 4 may be employed and/or some of the actions shown in FIG. 4 may be eliminated, without departing from the scope of claimed subject matter. Method 400 may include one or more of functional operations as indicated by one or more of blocks 410, 420, 430, and/or 440. The process of method 400 may begin at block 410.

At block 410, "Receive a Wide-Band Transmission from a Base Station via a Device", a wide-band transmission may be received via a device. In general, the wide-band transmission may include any suitable information and be received using any suitable technique or techniques. In some examples, the wide-band transmission may be received from one base station of three or more base stations. In some examples, the wide-band transmission may include distributed traffic symbol portions, distributed pilot symbol portions, and intermittent punctured pilot symbol portions. In general, the distributed traffic symbol portions may include traffic symbols representing the data to be received by the device. In general, the distributed pilot symbol portions may include symbols pre-known to the device that may be used for measuring channel conditions (e.g., equalizer gain, phase shifts, or the like), time synchronization, frequency synchronization, or the like. In some examples, the distributed pilot symbol portions may useful for time-of-arrival estimation techniques discussed herein. In some examples, the distributed traffic symbol portions and the distributed pilot symbol portions may be distributed amongst each other over time and/or frequency. In some examples, the distributed traffic symbol portions and the distributed pilot symbol portions may be distributed amongst each other in a pattern known to the receiving device.

Figure 5:
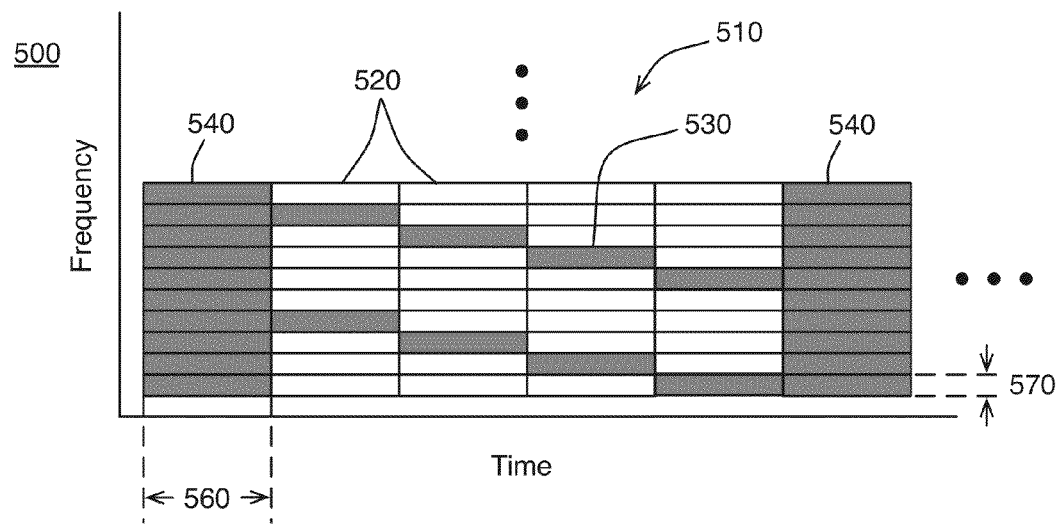
FIG. 5 is an illustration of a chart of an example wide-band transmission.

In general, the intermittent punctured pilot symbol portions may include symbols that may replace or puncture traffic symbol portions with pilot symbol portions as is discussed further herein and, in particular with respect to FIG. 5. In general, the intermittent punctured pilot symbol portions may be used to determine a time delay and/or distance between the receiving device and the transmitting base station, as is discussed further herein. In general, the use of intermittent punctured pilot symbol portions may provide increased transmission of pilot symbol portions for use in creating a power-delay profile, as is discussed further herein. In some examples, the intermittent punctured pilot symbol portions may include a multiple number of pilot symbols simultaneously transmitted across a majority of frequencies of the wide-band transmission. In general, the intermittent punctured pilot symbol portions may puncture any rate of traffic symbols. In some examples, the intermittent punctured pilot symbol portions may puncture traffic symbols at a rate ranging from about one punctured pilot symbol in five hundred traffic symbols to a rate of about one punctured pilot symbol in five thousand traffic symbols. In general, the wide-band transmission may include any additional information. As is discussed further herein, in some examples the wide band transmission may include predetermined position information associated with the individual base stations. The process of method 400 may continue at block 420.

At block 420, "Determine a Path Portion of the Wide-Band Transmission", a path portion of the wide-band transmission may be determined based on the received intermittent punctured pilot symbol portions. In some examples, the path portion may include a direct path portion of a multipath effect of the wide-band transmission. In some examples, the path portion may be a first path portion of the wide-band transmission such that the first path portion of the wide-band transmission may be associated with a first time delay and a second path portion of the wide-band transmission may be associated with a second time delay as discussed herein and, in particular, with respect to FIGS. 2 and 3. In general, the path portion may be determined using any suitable technique or techniques.

In some examples, the path portion may be determined by forming and evaluating a power-delay profile. In some examples, the power-delay profile may be formed and evaluated based on an evaluation of a multiple number of received intermittent punctured pilot symbol portions. In some examples, the power-delay profile may be determined by determining a matrix that may include an average of the outer-product of the received intermittent punctured pilot symbol portions. In some examples, the matrix may be evaluated to determine an eigenvector of the matrix. In some examples, the determined eigenvector may be used to determine whether radio energy related to various path portions may have been received at potential arrival time points. Such techniques may indicate a path portion having an attenuated power as discussed herein and, in particular, with respect to FIGS. 2 and 3. In general, any algorithm may be used to determine the discussed power-delay profile. In some examples, the power-delay profile may be determined in part using a Multiple Signal Classification (MUSIC) algorithm. In some examples, the power-delay profile may be determined in part using an algorithm capable of super-resolvability. In some examples, the power-delay profile may be determined in part using a Rayleigh Criterion.

In general, the described techniques may be performed based on any number of intermittent punctured pilot symbol portions and/or distributed pilot symbol portions. In some examples, the accuracy of the techniques may be improved by using more pilot symbol portions. In some examples, a duration may be used such that any number of intermittent punctured pilot symbol portions and/or distributed pilot symbol portions received during that duration may be used. In some examples, the duration may be in the range of about 1 to 5 seconds. In some examples, the duration may be in the range of about 5 to 15 seconds. In some examples, the duration may be in the range of about 15 to 30 seconds. In some examples, the techniques may include averaging the results of evaluating a multiple number of distributed pilot symbol portions. In some examples, a multiple number of results based on MUSIC algorithm techniques may be averaged. Such examples, may provide the detection of multipaths that may be heavily attenuated, weak, or buried in noise, or the like.

As discussed, a path portion of a wide-band transmission may be determined using the described techniques. In some examples, determining the path portion may include determining a path portion and evaluating an earlier portion of a power-delay profile for another path portion using a finer sampling technique. In general, such a finer sampling technique may be provided in any suitable manner. In some examples, the finer sampling may be provided using an analog-to-digital converter having a greater operating speed as is discussed further herein and, in particular, with respect to FIG. 6. Referring to FIG. 3, in some examples, peak 340 and delay time 345 may have been determined using the techniques discussed herein using a sampling rate. Such a determination may have been made during a first determination, for example. As will be appreciated, any earlier peaks related to an earlier multipath may be earlier in time than the determined peak 340. In some examples, a second determination may thereby be made on the portion of profile 310 before the time related to peak 340. Such a determination may be made using a finer sampling rate such that peak 330 may be detected using the finer sampling rate (although peak 330 may have been, in this example, not detected during the earlier determination). The process of method 400 may continue at block 430.

At block 430, "Determine a Distance Between the Device and the Base Station", a distance between the device and the transmitting base station may be determined. In general, the distance between the device and the transmitting base station may be determined using any suitable technique or techniques. In some examples, the distance between the device and the transmitting base station may be determined based on the determined path portion. In some examples, the distance between the device and the transmitting base station may be determined based on a time delay related to the determined path portion. In some examples, the distance between the device and the transmitting base station may be determined by multiplying a time delay related to the determined path portion by the speed of light (or a similar speed based on an expected speed of travel of the sent signal). The process of method 400 may continue at block 440.

At block 440, "Determine a Location of the Device", a location of the device may be determined. In general, the location of the device may be determined using any suitable technique or techniques. In some examples, the location of the device may be determined based on the determined distance. In some examples, the location of the device may be determined based on the determined distance and one or more other distances determined between the device and one or more other base stations. In some examples, the location of the device may be determined based on a triangulation technique using the determined distance and two other distances determined between the device and two other base stations. In some examples, the location of the device may be determined using position data received from one or more base stations.

In some examples, the position data may include predetermined position information associated with the individual base stations. In some examples, the position data may be transmitted from one or more of the base stations at predetermined times.

As discussed, method 400 provides techniques for determining the location of a device. In some examples, method 400 may be used in an indoor environment. In some examples, method 400 may be performed at the device. In some examples, method 400 or portions of method 400 may be performed at a base station or other device. For example, the device may determine a power-delay profile, a time-of-arrival for a signal, a distance from a base station, or the like and transmit such data to another device such that the location of the mobile device may be determined. Further, when a location of the device has been determined (either at the device or at another device), such information may be used in any suitable manner such as, for example, providing advertisers the location of a device for location-sensitive ads or coupons, providing a remote device the users location such that a friend may meet the user of the device, for use in mapping applications, or the like. In general, such device location information may be transmitted or received for use in any suitable manner.

FIG. 5 is an illustration of a chart 500 of an example wide-band transmission 510, arranged in accordance with at least some embodiments of the present disclosure. As shown, wide-band transmission 510 may include distributed traffic symbol portions 520, distributed pilot symbol portions 530, and intermittent punctured pilot symbol portions 540. As discussed, in general, distributed traffic symbol portions 520 may include traffic symbols representing data to be received by a device and distributed pilot symbol portions 530 may include symbols pre-known to the device that may be used for measuring channel conditions (e.g., equalizer gain, phase shifts, or the like), time synchronization, frequency synchronization, or the like. As shown, in some examples, distributed traffic symbol portions 520 and the distributed pilot symbol portions 530 may be distributed amongst each other over time and/or frequency. In some examples, distributed traffic symbol portions 520 and distributed pilot symbol portions 530 may be distributed amongst each other in a pattern known to the receiving device.

As discussed, in general, the intermittent punctured pilot symbol portions may include symbols that may replace traffic symbol portions with pilot symbol portions. In general, intermittent punctured pilot symbol portions 540 may be used to determine a distance between the receiving device and the transmitting base station, as is discussed further herein. In general, intermittent punctured pilot symbol portions 540 may be distributed in wide-band transmission 510 in any suitable manner and at any suitable frequency so long as the receiving device has an indication of the chosen pattern and/or frequency. As shown, in some examples, intermittent punctured pilot symbol portions 540 may include a multiple number of pilot symbols simultaneously transmitted across a majority of frequencies of wide-band transmission 510. In some examples, intermittent punctured pilot symbol portions 540 may include a multiple number of pilot symbols transmitted across all of the frequencies of wide-band transmission 510 at a particular time. In some examples, intermittent punctured pilot symbol portions 540 may include a multiple number of pilot symbols transmitted at a particular frequency continuously over time. In some examples, intermittent punctured pilot symbol portions 540 may include a multiple number of pilot symbols transmitted randomly throughout wide-band transmission 510.

In general, wide-band transmission 510 may provide an increase in the number of pilot symbol portions available for use in time-of-arrival estimation techniques such as those discussed herein. Such an increase in the number of pilot symbol portions may reduce the amount of bandwidth available for distributed traffic symbol portions 520, which, as discussed, carry data. However, such reductions may be substantially minor. As discussed, in some examples, a puncturing rate of about one punctured pilot symbol in five thousand traffic symbols to five hundred traffic symbols may be used. In such examples, assuming 1,024 sub-carriers spaced at 10 kHz, the error rate may be increased by 0.02% to 0.2% (i.e., $\frac{1}{5000}$ to $\frac{1}{500}$) which may not be a substantial increase. Further, such increased error rates may be substantially mitigated through error-control code techniques, power-control loop techniques, or the like. In general, the wide-band transmission may include any additional information. As is discussed further herein, in some examples the wide band transmission may include predetermined position information associated with the individual base stations.

As discussed, intermittent punctured pilot symbol portions 540 may be distributed in wide-band transmission 510 at any suitable frequency. In some examples, intermittent punctured pilot symbol portions 540 may puncture traffic symbols at a rate ranging from about one punctured pilot symbol in five hundred traffic symbols to a rate of about one punctured pilot symbol in five thousand traffic symbols. In general, wide-band transmission 510 may have any suitable characteristics including any number of sinusoidal sub-carriers, and symbol portions having any suitable duration 560 and/or tone width 570. In some examples, wide-band transmission 510 may have a number of sinusoidal sub-carriers ranging from about $2^9$ sinusoidal sub-carriers to about $2^{15}$ sinusoidal sub-carriers. In some examples, duration 560 may be about 0.1 msec and tone width 570 may be about 10 kHz.

As discussed, a power-delay profile may be formed and evaluated to determine an attenuated multipath portion of a wide-band transmission. In some examples, a higher sampling rate may increase the ability to determine an attenuated multipath such that a finer sampling may determine a finer peak of power over time, as discussed herein and, in particular, with respect to FIG. 3. Such finer sampling may be made over time such that a time sampling frequency may be increased. Such techniques may detect narrow peaks and finer structures in a power profile. In some examples, such increased sampling rates may be provided by including an analog-to-digital converter having a faster operating speed.

Figure 6:
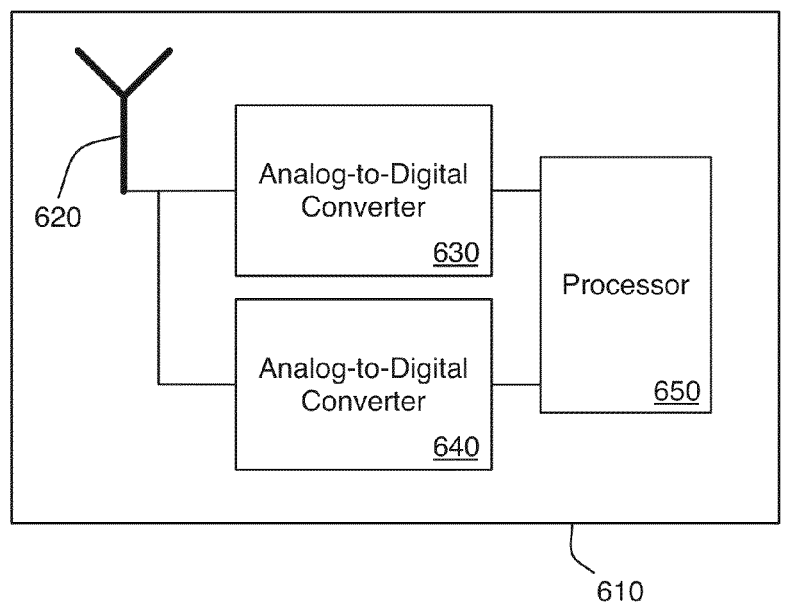
FIG. 6 is an illustration of an example device.

FIG. 6 is an illustration of an example device 600, arranged in accordance with at least some embodiments of the present disclosure. As shown, device 600 may include a housing 610, an antenna 620, an analog-to-digital converter 630 operably coupled to antenna 620, an analog-to-digital converter 640 operably coupled to antenna 620, and a processor 650 operably coupled to an analog-to-digital converter 630 and an analog-to-digital converter 640. Device 600 may be an example implementation of any device discussed herein. In some examples, device 600 may be a laptop computer, a mobile phone, a smartphone, a netbook device, a tablet device, a personal digital assistant, or the like. In general, housing 610 may include any suitable housing constructed of any suitable material. In some examples, housing 610 may include a hard plastic, a metal, a glass, or the like. In general, antenna 620 may include any suitable antenna or antennas suitable for the communications techniques discussed herein. In some examples, antenna 620 may be configured to receive a wide-band transmission transmitted from a base station as discussed herein.

In general, analog-to-digital converter 630 and analog-to-digital converter 640 may include any suitable analog-to-digital converter device or devices. In some examples, analog-to-digital converter 640 may have an operating speed greater than an operating speed of analog-to-digital converter 630. In some examples, analog-to-digital converter 630 may have an operating speed of about 10 MSamples/sec and analog-to-digital converter 640 may have an operating speed of about 100 MSamples/sec. In general, processor 650 may include any suitable processor or processors such as, for example, a microprocessor, a multicore processor, or the like. In some examples, processor 650 may be configured to switch between analog-to-digital converter 630 and analog-to-digital converter 640 so as to process the discussed distributed traffic symbol portions and/or distributed pilot symbol portions of a wide-band transmission via analog-to-digital converter 630, and so as to process the discussed intermittent punctured pilot symbol portions of the wide-band transmission via analog-to-digital converter 640. Such example configurations may provide the discussed increased sampling rates during the forming and/or evaluation of power-delay profiles discussed herein.

As discussed, in some examples, processor 650 may be configured to switch between analog-to-digital converter 630 and analog-to-digital converter 640. In some examples, processor 650 may be configured to perform one or more of the techniques discussed herein and, in particular, those techniques discussed with respect to method 400. In some examples, processor 650 may be configured to determine a path portion of a wide-band transmission based on the intermittent punctured pilot symbol portions such that the path portion is associated with a shortest time delay of a multipath wide-band transmission. In some examples, processor 650 may be configured to determine a distance between device 600 and a base station based on such a determined time delay. In some examples, processor 650 may be configured to determine a location of device 600 based on such a determined distance. In some examples, processor 650 may be configured to determine a location of device 600 based on a triangulation technique.

As discussed, in some examples, device 600 may include two analog-to-digital converters 630, 640 and processor 650 configured to select one of analog-to-digital convertors 630, 640 for processing. Such examples may offer the advantages of lower power usage. In some examples, a device may include one analog-to-digital converter having an operating rate chosen such that a balance may be struck between accuracy in determining the location of the device and power usage. In some examples, a device may include one analog-to-digital converter having a variable operating rate such that the analog-to-digital converter may operate a faster rate during the processing of intermittent punctured pilot symbol portions of a wide-band transmission and slower during the processing of distributed traffic symbol portions and/or distributed pilot symbol portions of a wide-band transmission.

As discussed, in some examples, device 600 may include processor configured to select one of analog-to-digital convertors 630, 640 for processing. In some examples, a device may include a switch operably coupled between antenna 620 and analog-to-digital convertors 630, 640 such that the switch may selectively and operably couple one of analog-to-digital convertors 630, 640 to antenna 120. In some examples, a down-converter and/or a mixer may be operably coupled between antenna 620 and analog-to-digital convertors 630, 640.

As discussed herein, profiles of multipath wide band transmissions may be used to determine a time delay related to a shortest portion of the multipath. Such a determined time delay may be used to determine the location of the device. In some examples, the profile may be based on received intermittent punctured pilot symbol portions. Such intermittent punctured pilot symbol portions may provide finer resolution in the profiles of multipath wide band transmissions. In general, the greater number of intermittent punctured pilot symbol portions the more information may be received allowing for greater averaging and reduced noise.

In general, the techniques discussed herein may be implemented in any suitable device such as a laptop computer, a mobile phone, a smartphone, a netbook device, a tablet device, a personal digital assistant, or the like. Such devices may receive, via a mobile device, a wide-band transmission having distributed traffic symbol portions, distributed pilot symbol portions, and intermittent punctured pilot symbol portions from at least one base station of three or more base stations, determine a first path portion of the wide-band transmission associated with a first time delay based on the intermittent punctured pilot symbol portions such that a second path portion of the wide-band transmission is associated with a second time delay, determine a distance between the mobile device and the at least one base station based on the first time delay, or determine a location of the mobile device based on the determined distance, or the like.

As discussed, in some examples, the techniques discussed herein may be performed at a base station, a host computer, a server, or the like, such that various processes in the discussed techniques may be offloaded from the mobile device. In some examples, a base station as discussed herein my be configured to provide a wide-band transmission as discussed herein and, in particular, a wide-band transmission as discussed with respect to FIG. 5. In some examples, a base station may be configured to transmit a wide-band transmission including distributed traffic symbol portions, distributed pilot symbol portions, and intermittent punctured pilot symbol portions.

FIG. 7 is an illustration of an example computer program product 700, arranged in accordance with at least some embodiments of the present disclosure. Computer program product 700 may include machine readable non-transitory medium having stored therein a plurality of instructions that, when executed, cause the machine to provide web tracking protection according to the processes and methods discussed herein. Computer program product 700 may include a signal bearing medium 702. Signal bearing medium 702 may include one or more machine-readable instructions 704, which, when executed by one or more processors, may operatively enable a computing device to provide the functionality described herein. In some examples, machine-readable instructions 704 may be provided as web browser software. In some examples, machine-readable instructions 704 may be provided as a web browser plug-in. In various examples, some or all of the machine-readable instructions may be used by the devices discussed herein.

In some implementations, signal bearing medium 702 may encompass a computer-readable medium 706, such as, but not limited to, a hard disk drive, a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.). In some examples, signal bearing medium 702 may encompass a machine readable non-transitory medium.

Figure 8:
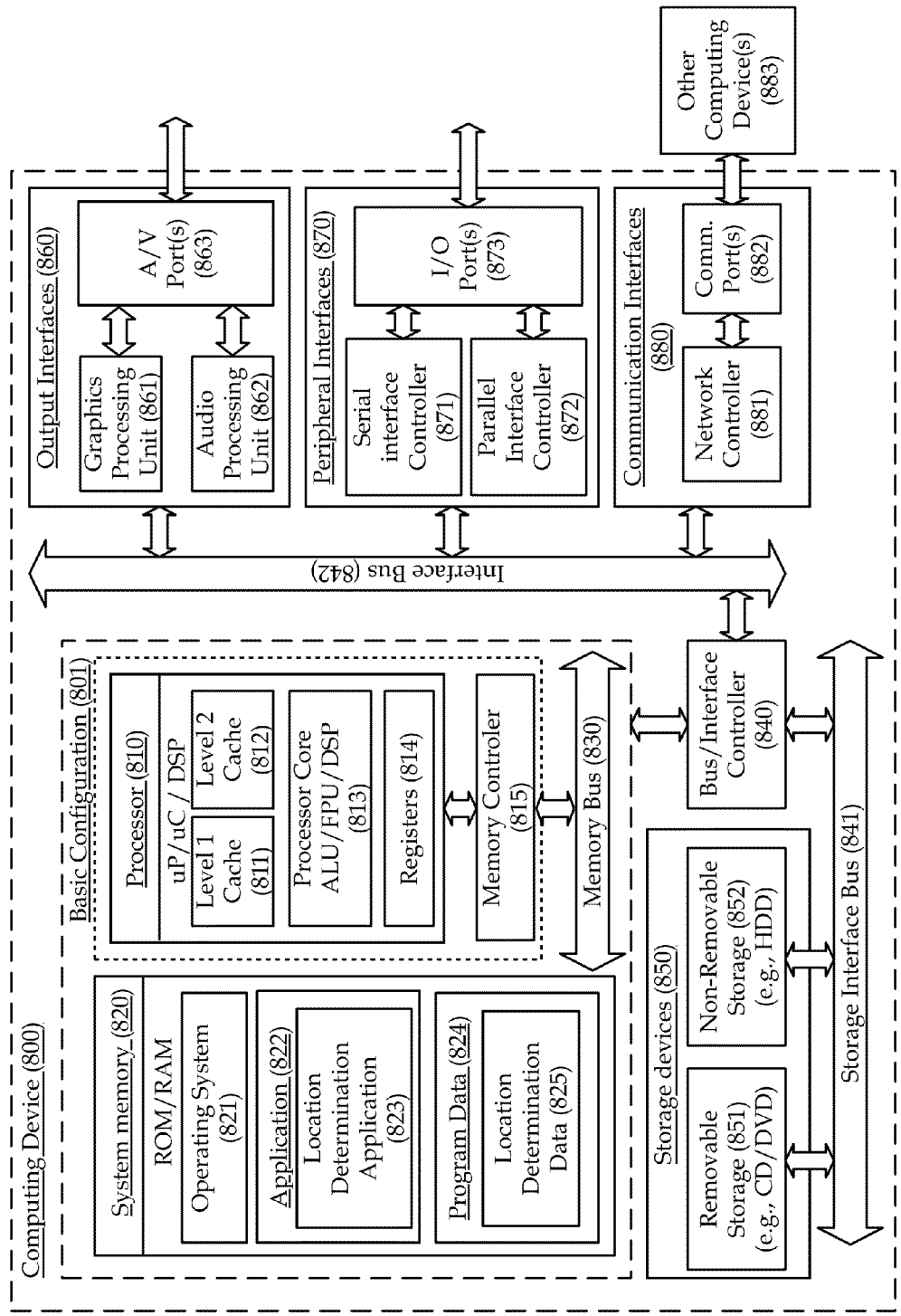
FIG. 8 is an illustration of a block diagram of an example computing device, all arranged in accordance with at least some embodiments of the present disclosure.
Figure 8:
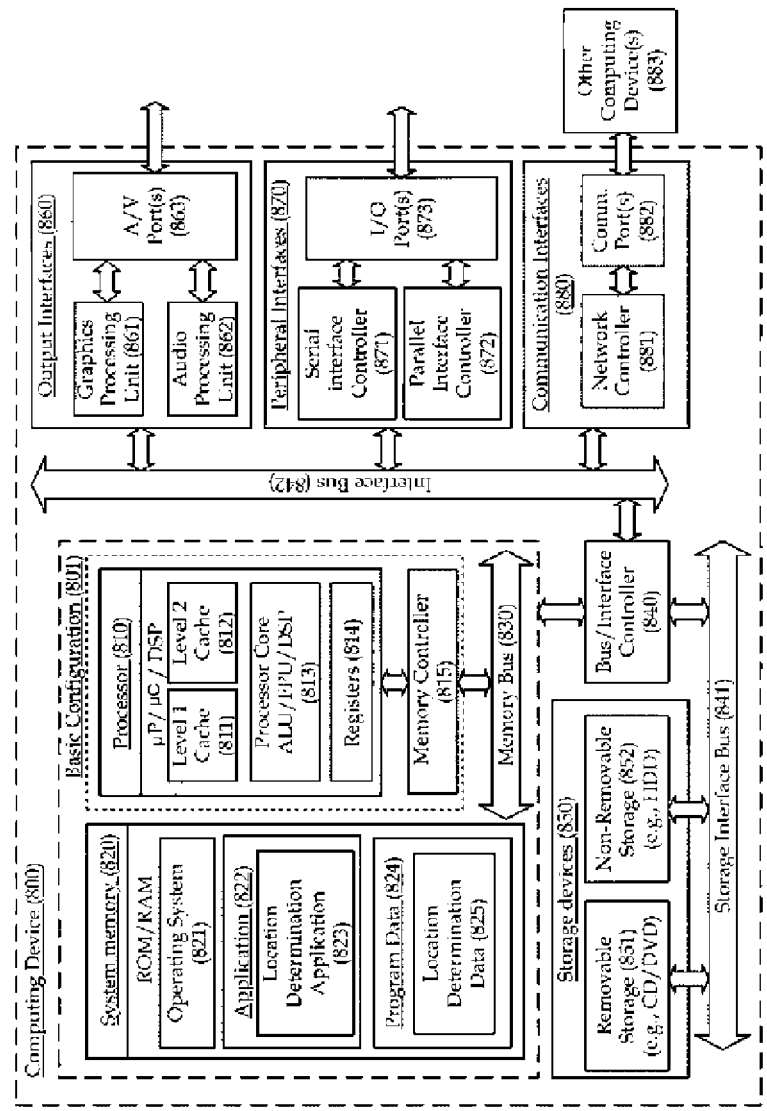

FIG. 8 is a block diagram illustrating an example computing device 800, arranged in accordance with at least some embodiments of the present disclosure. In various examples, computing device 800 may be configured to determine the location of a device in an indoor environment as discussed herein. In one example basic configuration 801, computing device 800 may include one or more processors 810 and system memory 820. A memory bus 830 can be used for communicating between the processor 810 and the system memory 820.

Depending on the desired configuration, processor 810 may be of any type including but not limited to a microprocessor (µP), a microcontroller (µC), a digital signal processor (DSP), or any combination thereof. Processor 810 can include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Application 822 may include location determination application 823 that can be arranged to perform the functions, actions, and/or operations as described herein including the functional blocks, actions, and/or operations described herein. Program Data 824 may include location determination data 825 for use with location determination application 823. In some example embodiments, application 822 may be arranged to operate with program data 824 on an operating system 821. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to the basic configuration 801 via the bus/interface controller 840. Example output interfaces 860 may include a graphics processing unit 861 and an audio processing unit 862, which may be configured to communicate to various external devices such as a display or speakers via one or more NV ports 863. Example peripheral interfaces 870 may include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 883 over a network communication via one or more communication ports 882. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 800 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 800 may also be implemented as a personal computer including both laptop computer and non-laptop computer configurations. In addition, computing device 800 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method, comprising:
   receiving, via a mobile device, a wide-band transmission transmitted from at least one base station of three or more base stations, wherein the wide-band transmission includes distributed traffic symbol portions, distributed pilot symbol portions, and intermittent punctured pilot symbol portions;
   determining, via the mobile device, a first path portion of the wide-band transmission based at least in part on sampling the intermittent punctured pilot symbol portions at a first resolution, and a second path portion based at least in part on sampling the distributed traffic symbol portions and distributed pilot symbol portions at a second resolution that is lower than the first resolution, wherein the first path portion of the wide-band transmission is associated with a first time delay and the second path portion of the wide-band transmission is associated with a second time delay;
   determining, via the mobile device, a distance between the mobile device and the at least one base station based at least in part on the first time delay; and
   determining, via the mobile device, a location of the mobile device based at least in part on the determined distance.

2. The method of claim 1, wherein the intermittent punctured pilot symbol portions comprise pilot symbols being simultaneously transmitted across at least a majority of frequencies of the wide-band transmission.

3. The method of claim 1, wherein the intermittent punctured pilot symbol portions comprise puncturing from a rate of about one punctured pilot symbol in five hundred traffic symbols to a rate of about one punctured pilot symbol in five thousand traffic symbols.

4. The method of claim 1, wherein the determining of a location of the mobile device is further based at least in part on position data that includes predetermined position information associated with the at least one base station that is transmitted at predetermined times.

5. The method of claim 1, wherein the wide-band transmission comprises from about $2^9$ sinusoidal sub-carriers to about $2^{15}$ sinusoidal sub-carriers.

6. The method of claim 1, wherein the determining of the first path portion is based at least in part on a power-delay profile.

7. The method of claim 1, wherein the determining of the first path portion is based at least in part on a Multiple Signal Classification (MUSIC) algorithm.

8. The method of claim 1, wherein the determining of the first path portion is based at least in part on an algorithm capable of super-resolvability.

9. The method of claim 1, wherein the determining of the first path portion samples only up to and including the sampling on which the determining of the second path portion is based.

10. The method of claim 1, wherein the intermittent punctured pilot symbol portions comprise pilot symbols being simultaneously transmitted across at least a majority of frequencies of the wide-band transmission from a rate of about one punctured pilot symbol in five hundred traffic symbols to a rate of about one punctured pilot symbol in five thousand traffic symbols;

wherein the determining of a location of the mobile device is further based at least in part on position data that includes predetermined position information associated with the at least one base station that is transmitted at predetermined times;

wherein the wide-band transmission comprises from about $2^9$ sinusoidal sub-carriers to about $2^{15}$ sinusoidal sub-carriers;

wherein the determining of the first path portion is based at least in part on a power-delay profile and on an algorithm capable of super-resolvability; and wherein the determining of the first path portion samples only up to and including the sampling on which the determining of the second path portion is based.

11. A mobile handset apparatus, comprising:
a housing;
an antenna located within the housing;
a first analog-to-digital converter operably coupled to the antenna;
a second analog-to-digital converter operably coupled to the antenna, wherein the second analog-to-digital converter has an operating speed greater than the first analog-to-digital converter; and
a processor operably coupled to the first and second analog-to-digital converters;
wherein the processor is configured to switch between the first and second analog-to-digital converters so as to process distributed traffic symbol portions and/or distributed pilot symbol portions of a wide-band transmission transmitted from at least one base station of three or more base stations via the first analog-to-digital converter, and so as to process intermittent punctured pilot symbol portions of the wide-band transmission via the second analog-to-digital converter.

12. The apparatus of claim 11, wherein the processor is further configured to:
determine a first path portion of the wide-band transmission based at least in part on the intermittent punctured pilot symbol portions, wherein the first path portion of the wide-band transmission is associated with a first time delay and a second path portion of the wide-band transmission is associated with a second time delay;
determine a distance between the mobile device and the at least one base station based at least in part on the first time delay; and
determine a location of the mobile device based at least in part on the determined distance.

13. The apparatus of claim 12, wherein the intermittent punctured pilot symbol portions comprise pilot symbols being simultaneously transmitted across at least a majority of frequencies of the wide-band transmission.

14. The apparatus of claim 12, wherein the intermittent punctured pilot symbol portions comprise puncturing from a rate of about one punctured pilot symbol in five hundred traffic symbols to a rate of about one punctured pilot symbol in five thousand traffic symbols.

15. The apparatus of claim 12, wherein the determining of a location of the mobile device is further based at least in part on position data that includes predetermined position information associated with the at least one base station that is transmitted at predetermined times.

16. The apparatus of claim 12, wherein the wide-band transmission comprises from about $2^9$ sinusoidal sub-carriers to about $2^{15}$ sinusoidal sub-carriers.

17. The apparatus of claim 12, wherein the determining of the first path portion is based at least in part on a power-delay profile.

18. The apparatus of claim 12, wherein the determining of the first path portion is based at least in part on an algorithm capable of super-resolvability.

19. The apparatus of claim 12, wherein the determining of the first path portion comprises a first and a second determination of the first path portion, wherein the second determination of the first path portion samples only up to and including an earliest path portion identified by the first determination of the first path portion and has a finer sampling as compared with the first determination of the first path portion.

20. An article comprising:
a non-transitory signal bearing medium comprising machine-readable instructions stored thereon, which, if executed by one or more processors, operatively enable a computing device of a mobile device to:
receive a wide-band transmission transmitted from at least one base station of three or more base stations, wherein the wide-band transmission includes distributed traffic symbol portions, distributed pilot symbol portions, and intermittent punctured pilot symbol portions;
determine a first path portion of the wide-band transmission based at least in part on sampling the intermittent punctured pilot symbol portions at a first resolution, and a second path portion based at least in part on sampling the distributed traffic symbol portions and distributed pilot symbol portions at a second resolution that is lower than the first resolution, wherein the first path portion of the wide-band transmission is associated with a first time delay and the second path portion of the wide-band transmission is associated with a second time delay;
determine a distance between the mobile device and the at least one base station based at least in part on the first time delay; and
determine a location of the mobile device based at least in part on the determined distance.

21. The article of claim 20, wherein the intermittent punctured pilot symbol portions comprise pilot symbols being simultaneously transmitted across at least a majority of frequencies of the wide-band transmission from a rate of about one punctured pilot symbol in five hundred traffic symbols to a rate of about one punctured pilot symbol in five thousand traffic symbols;

wherein the determining of a location of the mobile device is further based at least in part on position data that includes predetermined position information associated with the at least one base station that is transmitted at predetermined times;

wherein the wide-band transmission comprises from about $2^9$ sinusoidal sub-carriers to about $2^{15}$ sinusoidal sub-carriers;

wherein the determining of the first path portion is based at least in part on a power-delay profile and on an algorithm capable of super-resolvability; and wherein the determining of the first path portion samples only up to and including the sampling on which the determining of the second path portion is based.

* * * * *

UNITED STATES PATENT AND TRADEMARK OFFICE
CERTIFICATE OF CORRECTION

PATENT NO. : 9,055,396 B2  
APPLICATION NO. : 13/700393  
DATED : June 9, 2015  
INVENTOR(S) : Keerthi It is certified that error appears in the above-identified patent and that said Letters Patent is hereby corrected as shown below:

On Page 2, item (56), under "Other Publications", in Column 2, Line 1, delete "diversiy" and insert -- diversity --, therefor.

In the drawings,

In the drawing sheet, consisting of Fig. 8, should be deleted to be replaced with the drawing sheet, consisting of Fig. 8, as shown on the attached pages.

In the specification,

In Column 1, Lines 5-6, delete "35 U.S.C. §371" and insert -- 35 U.S.C. § 371 --, therefor.

In Column 1, Line 7, delete "2012." and insert -- 2012, and also claims the benefit of Indian Patent Application "914/CHE/2012" filed on March 13, 2012, --, therefor.

In Column 2, Line 32, delete "illustration an" and insert -- illustration of an --, therefor.

In Column 3, Line 43, delete "device 100" and insert -- device 110 --, therefor.

In Column 4, Line 18, delete "device 100" and insert -- device 110 --, therefor.

In Column 4, Line 65, delete "illustration an" and insert -- illustration of an --, therefor.

In Column 5, Line 18, delete "and or" and insert -- and/or --, therefor.

In Column 10, Line 62, delete "antenna 120" and insert -- antenna 620 --, therefor.

In Column 13, Line 12, delete "NV ports 863" and insert -- A/V ports 863. --, therefor.

In Column 14, Line 34, delete "and or" and insert -- and/or --, therefor.

Signed and Sealed this  
Twenty-fourth Day of November, 2015

Michelle K. Lee  
*Director of the United States Patent and Trademark Office*